United States Patent Office 3,223,752
Patented Dec. 14, 1965

3,223,752
DYEABLE POLYOLEFIN CONTAINING
MODIFIED POLYESTER
Cilton W. Tate and Jack G. Scruggs, Cary, N.C., assignors, by mesne assignments, to Monsanto Company, a corporation of Delaware
No Drawing. Filed May 31, 1961, Ser. No. 113,671
19 Claims. (Cl. 260—873)

This invention relates to improved polyolefin compositions. More particularly, it relates to the use of modified polyesters to improve the dyeing and spinning of polyolefins without deteriorating other properties which render them useful in textile applications.

Recently the advent of stereoregular, highly crystalline polyolefins has resulted in substantial interest being expressed in polyolefins as filament and fiber-forming materials. Polyolefins are limited in their use as textile filaments and fibers primarily because of their poor dyeability, ultra violet light stability and low melting point. Many proposals have been put forth in the past to improve these defects of otherwise excellent textile fibers. Such proposals have, however, nearly always resulted in some deterioration of other fiber properties or in limited or negligible dye receptivity.

Accordingly, it is an object of this invention to provide improved filament and fiber-forming polyolefin compositions. Another object of this invention is to provide polyolefin filaments and fibers having improved affinity for dyestuffs, particularly disperse dyestuffs, without serious deterioration of the physical properties of the fiber by blending with modified polyesters. A further object of the invention is to provide a process for the preparation of polyolefins blended with various amounts of a modified polyester. Other objects and advantages will become apparent from the description hereinafter.

In general the objects of this invention are accomplished by blending polyolefins with from about 1 to 20 percent of a modified polyester, then extruding the blend to form polyolefin filaments and fibers which are more receptive to disperse dyestuffs.

The blending may be accomplished by grinding the polyolefin and the polyester to be mixed therewith to a fine powder. The two powders are then thoroughly blended mechanically, transferred to an appropriate container, melted and stirred for about 15 minutes to one hour to insure homogeneity of the melt. The molten polymer is extruded through a suitable spinneret at a temperature of from about 210 to 280° C. The disperse dye uptake and dye light fastness are improved.

The proportions of polyolefin and modified polyester may be varied according to the type of end product desired. The invention is applicable to crystalline polyolefins containing from about 1 to about 20 percent polyester by weight, preferably from about 8 to about 15 percent polyester. The specific viscosity, measured in p-zylene at 110° C. using a 0.1 percent polymer concentration, of these polyolefins may range from 0.10 to 0.25, preferably from 0.12 to 0.20. Suitable polyolefins, the preparation of which is well known in the prior art, include polymers from alpha-olefins such as polyethylene, polypropylene, polybutene-1, poly-4-methylpentene-1 and the like.

The term "modified polyester" as used herein refers to polyesters prepared from aromatic and aliphatic dicarboxylic acids or their esters and glycols with modification achieved by employing a mixture of acids or glycols. Modification is also achieved by employing chain-terminators and chain-branching agents in combination with the acids and glycols. For example, such modified polyesters may be prepared from a mixture of two acids and a glycol, an acid and a mixture of glycols, or from a dicarboxylic acid and a glycol in combination with chain-terminators or chain-terminators and chain-branching agents.

Among the aromatic and aliphatic dicarboxylic acids and ester-forming derivatives thereof useful in the present invention there may be named oxalic, malonic, succinic, glutaric, adipic, suberic, azelaic, sebacic, terephthalic, isophthalic acid, p-carboxyphenoacetic acid, p,p'-dicarboxylbiphenyl, p,p'-dicarboxylcarbanilide, p,p'-dicarboxythiocarbanilide, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyphenoxyheptanoic acid, p,p'-dicarboxydiphenylmethane, p,p'-dicarboxydiphenylethane, p,p'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p' - dicarboxydiphenyloctane, p,p'-dicarboxyldiphenoxyethane, p,p'-dicarboxydiphenoxypropane, p,p'-dicarboxydiphenoxybutane, p,p'-dicarboxydiphenoxypentane, p,p'-dicarboxydiphenoxyhexane, 3-alkyl 4-(β-carboxy-ethoxy) benzoic acid and the polyester forming derivatives thereof such as the acid halides and alkyl diesters of the above-named compounds and the like.

Suitable glycols which may be employed in the practice of the instant invention include aliphatic and aromatic glycols containing from 2 to 12 carbon atoms. Examples of such glycols include cycloaliphatic and straight and branched-chain aliphatic glycols such as ethylene glycol, propylene glycol, trimethylene glycol, tetramethylene glycol, pentamethylene glycol, hexamethylene glycol, sym-dimethyl ethylene glycol, 2,2-dimethyl-1, 3-propanediol, 1,4-cyclohexanedimethanol, 1,3-cyclohexanediol, 1,4-cyclohexanediol; aromatic glycols such as p-xylylene glycol, pyrocatechol, resorcinol, hydroquinol, orcinol, cresorcinol, saligenin; and alkyl substituted derivatives thereof and the like. Mixtures of these and other suitable glycols well known in the prior art may also be employed in the preparation of the polyesters of this invention.

The modified polyesters of this invention may be obtained by replacing from 5 to 25 percent by weight of the aromatic and aliphatic dicarboxylic acids or esters enumerated herein with a long chain aliphatic dicarboxylic acid or the alkyl diester thereof containing from 16 to 32 carbon atoms. As examples of suitable long chain aliphatic dicarboxylic acids and esters there may be mentioned hexadecanedioic acid, heptadecanedioic acid, octodecanedioic acid, nonadecanedioic acid, eicosanedioic acid, heneicosanedioic acid, pentacosanedioic acid, triacontanedioic acid, dimethyl 1,20-eicosane dioate, dimethyl 8-ethyl octodecane-1,18 dioate and the like.

The modified polyesters of this invention may also be obtained by replacing up to 20 percent by weight of the above noted aliphatic and aromatic glycols with heterocyclic glycols. As examples of suitable heterocyclic glycols there may be mentioned compounds consisting of one or more five (5) membered O containing rings such as 2,5 dihydroxymethyl furan, 3,4 dihydroxy furan and isosorbide; compounds consisting of one or more five (5) membered N containing rings such as 2,5 dihydroxyethyl pyrrole, 3,4 dihydroxymethyl pyrazole and 2,4 dihydroxy imidazole; compounds consisting of one or more five (5) membered O and N containing rings such as 2,5 dihydroxy oxazole, 2,5 dihydroxyethyl oxazole and 3,4 dihydroxy isooxazole; compounds consisting of one or more six (6) membered O containing rings such as 2,6 dihydroxy tetrahydropyran and 3,5 dihydroxy tetrahydropyran; compounds consisting of one or more six (6) membered N containing rings such as 2,6 dihydroxyethyl piperazine, 2,6 dihydroxy methyl piperazine and 2,6 dihydroxymethyl pyridine; and compounds consisting of one or more six (6) membered O and N containing rings such as 2,6 dihydroxyethyl morpholine and the like.

In the preparation of the glycol modified polyesters of this invention a suitable selection of acid, glycol and heterocyclic glycol is made and the ingredients with a standard polyester catalyst are mixed in a suitable container, heated to around 170 to 190° C. and stirred at constant temperature until the removal of methanol is complete. The temperature is then raised to a range of from 260 to 285° C., preferably 275° C., and held for about one hour at which time the polymerization is complete.

Modified polyesters may also be prepared by reaction with chain-terminating compounds having hydrophilic properties, such as the monofunctional ester-forming polyethers bearing the general formula, (I)    $R—O—[(CH_2)_mO]_x(CH_2)_n—OH$ wherein R is an alkyl group containing 1 to 18 carbon atoms or an aryl group containing 6 to 10 carbon atoms, and m and n are integers from 2 to 22, and $x$ is a whole number indicative of the degree of polymerization, that is, $x$ is an integer from 1 to 100 or greater. Examples of such compounds are methoxypolyethylene glycol, ethoxypolyethylene glycol, n-propoxypolyethylene glycol, isopropoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxypolymethylene glycol, and the like. Another group of suitable chain-terminating compounds are polyalkylvinyl ethers having one terminal hydroxyl group which are the addition polymers prepared by the homopolymerization of alkylvinyl ethers wherein the alkyl group contains from 1 to 4 carbon atoms. Examples of such chain-terminating agents are hydroxy polymethylvinyl ether, hydroxy polyethylvinyl ether, hydroxy polypropylvinyl ether, hydroxy polybutylvinyl ether, hydroxy polyisobutylvinyl ether, and the like. The chain-terminating agents or compounds may be employed in the preparation of the modified polyesters in amounts ranging from 0.05 mol percent to 4.0 mol percent, based on the amount of discarboxylic acid or dialkyl ester thereof employed in the reaction mixture. It is to be noted that when chain-terminating agents are employed alone, i.e., without a chain-branching agent, the maximum amount that can be employed in the reaction mixture is 1.0 mol percent. Thus, unexpectedly, the addition of controlled amounts of chain-branching agents along with the chain-terminating agents allows the introduction of an increased amount of the latter into the polymer chain than is otherwise possible when employing the chain-terminating agents alone.

One will readily appreciate that the weight percent of chain-terminating agent which may be employed in this invention will vary with the molecular weight of the agent. The range of average molecular weight of the chain-terminating agents suitable for use in this invention is from 500 to 5000, with those agents having a molecular weight in the range of 1000 to 3500 being preferred.

Further modification is possible by employing chain-branching agents which are employed to increase the viscosity or molecular weight of the polyesters, such as polyols which have a functionality greater than two, that is, which contain more than two functional groups, such as hydroxyl. Examples of suitable chain-branching agents are compounds having the formula:

(II)    $R—(OH)_n$ wherein R is a saturated aliphatic hydrocarbon radical containing from 3 to 6 carbon atoms and $n$ is an integer from 3 to 6, for example, glycerol, sorbitol, pentaerythritol, 1,2,6-hexanetriol, and the like; compounds having the formula:

(III)    $R—(CH_2OH)_3$ wherein R is a saturated aliphatic hydrocarbon radical containing from 2 to 6 carbon atoms, for example, trimethylol ethane, trimethylol propane, and like compounds up to trimethylol hexane; and the compounds having the formula:

(IV) 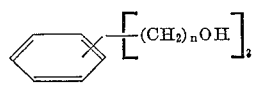

wherein $n$ is an integer from 1 to 6. As examples of compounds having the above formula there may be named 1,3,5-trimethylol benzene, 1,3,5-triethylol benzene, 1,3,5-tripropylol benzene, 1,3,5-tributylol benzene, 1,2,4-trimethylol benzene, 1,2,4-triethylol benzene, etc.

Aromatic polyfunctional acid esters may also be employed in this invention as chain-branching agents and particularly those having the formula:

(V) 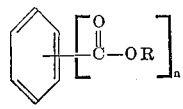

wherein $n$ is an integer from 3 to 5 and R may be an alkyl group containing from 1 to 4 carbon atoms. As examples of compounds having the above formula there may be named trimethyl trimesate, tetramethyl pyromellitate, tetramethyl mellophonate, trimethyl hemimellitate, trimethyl trimellitate, tetramethyl prehnitate, and the like. In addition, there may be employed mixtures of the above esters which are obtained in practical synthesis. That is, in most instances when preparing any of the compounds having the above formula, other related compounds having the same formula may be present in small amounts as impurities. This does not affect the compound as a chain-branching agent in the preparation of the modified polyesters and copolyesters described herein.

The chain-branching agents or cross-linking agents may be employed in the preparation of the polyesters and copolyesters in amounts ranging from 0.05 mol percent to 2.4 mol percent, based on the amount of dicarboxylic acid or dialkyl ester thereof employed in the reaction mixture. The preferred range of chain-branching agent for use in the present invention is from 0.1 to 1.0 mol percent.

The preparation of polyesters modified with chain-terminators and chain-branching agents is well known in the prior art, particularly as revealed in U.S. Patents 2,895,946 and 2,905,657.

The polypropylene modified polyester blends of the present invention exhibit desirable textile properties to a much greater extent than would be expected from a knowledge of prior art improvements employing, for example, a polyamide or an unmodified polyester. Such blends not only exhibit better dyeability, but also greatly improved spinnability and resistance to ultra violet light degradation.

The long chain polyester modifiers of this invention, such as methoxypolyethylene glycol, increase the compatability of the modified polyesters in polypropylene. This compatability is due to the fact that a modified polyester will dissolve in polypropylene to a greater extent than an unmodified one and form a polymer blend having complete molten homogeneity at a lower temperature. An unmodified polyester at the same temperature does not combine with polypropylene, the polymers are still in two phases, and the higher temperature required to successfully blend the two polymers results in greater thermal degradation of the polypropylene. This improved compatability and lower melting point facilitates and speeds up the overall melt-spinning operation. Fibers spun from the polypropylene modified polyesters of the invention are highly receptive to disperse dyes. No carrier is needed for dyeing and any prior art method of dyeing is suitable. Such fibers show improved resistance to ultra violet light degradation. The modified polyester is highly resistant and, therefore, helps the poorly resistant polypropylene retain strength by absorbing appreciable amounts of the ultra violet light radiation. In contrast, an unmodified polyester, that is a polyester without any chain-terminators, chain-branching agents or other modifiers contemplated by this invention, such as polyethylene terephthalate or polypropylene sebacate when blended with polyolefins does not form comparable textile filaments and fibers. Such unmodified polyesters cannot be spun or dyed without difficulty. Polyethylene terephthalate is essentially a two component system which does not blend successfully with polyolefins for purposes of melt spinning. A completely aliphatic system would also be unsatisfactory.

The invention is further illustrated by the following examples in which all parts and percents are by weight unless otherwise indicated.

EXAMPLE I 108 grams of polypropylene, dried and ground to a fine powder were mechanically blended with 12 grams of a modified polyester comprising 94 percent polyethylene terephthalate and 6 percent methoxypolyethylene glycol which was ground in a Wiley mill equipped with a 40 mesh screen. The blend was transferred to an autoclave melted and stirred for ½ hour, to insure homogenity of the melt. The molten polymer was then spun through a 10 hole jet at a temperature of 265° C. using 120 pounds of pressure for the extrusion. The resultant fiber was dyed with disperse dye. Dye uptake was very good, the dye light fastness equivalent to that of nylon with the same dyes.

EXAMPLE II

A modified polyester was prepared comprising a copolyester derived from dimethyl terephthalate and a mixture of glycols, the glycol mixture comprising 90 parts ethylene glycol and 10 parts isosorbide which is a compound containing two fused cis orientated tetrahydrofuran rings and may also be designated 1,4:3,6-dianhydro-D-glucitol. 2 grams of this modified polyester were blended with 18 grams polypropylene and melt extruded as in Example I. The fiber obtained was readily dyed with disperse dyes.

EXAMPLE III 18 grams of polypropylene and 2 grams of a modified polyester comprising 90 percent polyethylene terephthalate and 10 percent methoxypolyethylene glycol of a molecular weight of 3,000 were blended and melt extruded as in Example I. The fiber obtained was easily dyed with disperse dyes.

EXAMPLE IV

In this example a polypropylene modified polyester fiber was prepared from a polymer blend comprising 95 percent polypropylene and 5 percent of a modified polyester comprising polyethylene terephthalate modified with 0.1 wt. percent, based on dimethyl terephthalate, of pentaerythritol and 6.0 wt. percent, based on dimethyl terephthalate, of methoxypolyethylene glycol. The percent dye uptake was measured in a 50:1 liquor to fiber bath or a 2% ratio of fiber wt. to dye solution. Measurements were taken by spectrophotometer after one hour at 100° C. The following results were obtained:

Dye: Percent uptake
Latyl Blue FLVY _____ 61
Latyl Brilliant Yellow 3G _____ 45
Polyester Pink LB _____ 37

Certain physical properties of this 95/5 blend were compared with polypropylene to determine how fiber properties were affected by the modified polyester.

Standard conditions (70° F. and 65% relative humidity)

|  | Polypropylene | 95/5 Blend |
|---|---|---|
| Denier | 3 | 2.95 |
| Tenacity | 7.6 | 6.8 |
| Percent Elongation | 28 | 26 |
| Modulus | 63 | 59.8 |

IN WATER AT 200° F.

|  | Polypropylene | 95/5 Blend |
|---|---|---|
| Denier | 3 | 3.18 |
| Tenacity | 3.3 | 3.2 |
| Percent Elongation | 130 | 94.0 |
| Modulus | 9.5 | 10.86 |

EXAMPLE V 10 grams of polypropylene sebacate and 90 grams of polypropylene were dry blended, placed in an autoclave heated to 200° C. and stirred to insure complete blending. An attempt was made to melt spin the blend under the following conditions:

|  | Spinneret Temp. | Autoclave Temp. |
|---|---|---|
| Run No. 1 | 182 | 214 |
| Run No. 2 | 228 | 253 |
| Run No. 3 | 250 | 257 |

The melt flowed freely through the spinneret at all three temperature settings. But, fiber could not be obtained due to incompatibility of the two polymers, as evidenced by their separation into two phases at the face of the spinneret or just below the face. On standing in the autoclave the molten polymer blend appeared to separate into two phases.

EXAMPLE VI 5 grams of polypropylene sebacate was blended with 95 grams polypropylene as in Example V. Attempts to spin this blend were also unsuccessful. Autoclave temperatures ranging from 190 to 250° C. were tried with spinneret temperatures of 180 to 230° C.

EXAMPLE VII 10 grams of polyethylene terephthalate were dry blended with 90 grams of polypropylene and the blend placed in an autoclave, stirred and heated to 230° C. to effect complete solution or homogeneity of the two component system. The following spinning conditions were attempted.

|  | Autoclave Temp. | Spinneret | Pressure in Lbs. |
|---|---|---|---|
| No. 1 | 230 | 250 | 30 |
| No. 2 | 240 | 265 | 30 |
| No. 3 | 255 | 275 | 40 |
| No. 4 | 265 | 280 | 40 |

Under No. 1 very little extrudate could be obtained. No. 2 and No. 3 gave some material which consisted of molten polypropylene with undissolved particles of polyester contained therein. Numerous breaks prevented the use of a take up apparatus. No. 4 gave some fiber which could be taken up on a winder, but could not be drawn due to numerous breaks. Distinct areas of undissolved polyester existed.

Examples V, VI and VII illustrate the poor compatibility and spinning difficulties encountered when attempting to blend an unmodified polyester with polypropylene. The remaining examples are characteristic of the excellent blending results obtainable when using the modified polyesters of this invention.

It will be understood to those skilled in the art that many apparently widely different embodiments of this invention can be made without departing from the spirit

We claim:

1. A new composition of matter comprising a crystalline polymer of an alpha-monoolefin of 2 to 5 carbon atoms and a modified polyester, said polyester being formed by the reaction of at least one dicarboxylic acid and at least one glycol containing from 2 to 12 carbon atoms, and being modified by a compound selected from the group consisting of (A) aliphatic dicarboxylic acids containing from 16 to 32 carbon atoms and the alkyl diesters thereof, (B) heterocyclic glycols, (C) 0.05 mol perment to 1.0 mol percent, based on the total weight of said dicarboxylic acid, of a chain-terminator selected from the group consisting of polyalkylvinyl ethers having one terminal hydroxyl group wherein the alkyl group contains 1 to 4 carbon atoms, and compounds having the formula, (I) $\quad R\text{—}O\text{—}[(CH_2)_mO]_x(CH_2)_n\text{—}OH$ wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (D) 0.05 mol percent to 4.0 mol percent, based on the total weight of said dicarboxylic acid, of said chain terminator of (C) further modified by 0.05 mol percent to 2.4 mol percent, based on the total weight of said dicarboxylic acid, of a chain-branching agent selected from the group consisting of compounds having the formula, (II) $\quad R\text{—}(OH)_n$ wherein R is a saturated aliphatic hydrocarbon radical containing from 3 to 6 carbon atoms and $n$ is an integer from 3 to 6, compounds having the formula, (III) $\quad R\text{—}(CH_2OH)_3$ wherein R is a saturated aliphatic hydrocarbon radical containing from 2 to 6 carbon atoms, compounds having the formula, (IV)

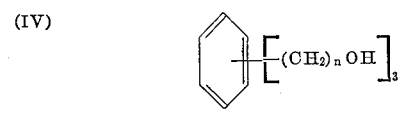

wherein $n$ is an integer from 1 to 6, and compounds having the formula, (V)

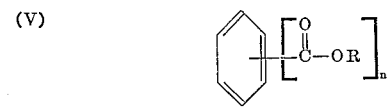

wherein $n$ is an integer from 3 to 5 and R is an alkyl radical of up to 3 carbon atoms.

2. The composition of matter of claim 1 wherein the polyolefin is polypropylene.

3. The composition of matter of claim 1 wherein the polyolefin is polyethylene.

4. The composition of matter of claim 1 wherein the polyolefin is polybutene-1.

5. The composition of matter of claim 1 wherein the modified polyester is formed by the reaction of terephthalic acid, ethylene glycol and methoxypolyethylene glycol.

6. The composition of matter of claim 1 wherein the modified polyester is formed by the reaction of terephthalic acid, ethylene glycol and isosorbide.

7. The composition of matter of claim 1 wherein the modified polyester is formed by the reaction of terephthalic acid, ethylene glycol, methoxypolyethylene glycol and pentaerythritol, 8. The composition of matter of claim 1 wherein the modified polyester is formed by the reaction of terephthalic acid, ethylene glycol and dimethyl 1,20-eicosane dioate.

9. A process for the preparation of polyolefins having improved textile properties comprising mixing a crystalline polymer of an alpha-monoolefin of 2 to 5 carbon atoms with a modified polyester, said polyester being formed by the reaction of at least one dicarboxylic acid and at least one glycol containing from 2 to 12 carbon atoms, and being modified by a compound selected from the group consisting of (A) aliphatic dicarboxylic acids containing from 16 to 32 carbon atoms and the alkyl diesters thereof, (B) heterocyclic glycols, (C) 0.05 mol percent to 1.0 mol percent, based on the total weight of said dicarboxylic acid, of a chain-terminator selected from the group consisting of polyalkylvinyl ethers having one terminal hydroxyl group wherein the alkyl group contains 1 to 4 carbon atoms, and compounds having the formula, (I) $\quad R\text{—}O\text{—}[(CH_2)_mO]_x(CH_2)_n\text{—}OH$ wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (D) 0.05 mol percent to 4.0 mol percent, based on the total weight of said dicarboxylic acid, of said chain-terminator of (C) further modified by 0.05 mol percent to 2.4 mol percent, based on the total weight of said dicarboxylic acid, of a chain-branching agent selected from the group consisting of compounds having the formula, (II) $\quad R\text{—}(OH)_n$ wherein R is a saturated aliphatic hydrocarbon radical containing from 3 to 6 carbon atoms and $n$ is an integer from 3 to 6, compounds having the formula, (III) $\quad R\text{—}(CH_2OH)_3$ wherein R is a saturated aliphatic hydrocarbon radical containing from 2 to 6 carbon atoms, compounds having the formula, (IV)

wherein $n$ is an integer from 1 to 6, and compounds having the formula, (V)

wherein $n$ is an integer from 3 to 5, and R is an alkyl radical of up to 3 carbon atoms, melting the mixture and stirring until a homogeneous polyolefin modified polyester blend is obtained.

10. The process of claim 9 wherein the polyolefin is polypropylene.

11. The process of claim 9 wherein the polyolefin is polyethylene.

12. The process of claim 9 wherein the polyolefin is polybutene-1.

13. The process of claim 9 wherein the polyester is polyethylene terephthalate and the chain-terminator is methoxypolyethylene glycol.

14. The process of claim 9 wherein the polyester comprises the reaction product of terephthalic acid, ethylene glycol and isosorbide.

15. The process of claim 9 wherein the polyester is polyethylene terephthalate, the chain-terminator is methoxypolyethylene glycol and the chain-branching agent is pentaerythritol.

16. The process of claim 9 wherein the modified polyester is formed by the reaction of terephthalic acid, ethylene glycol and dimethyl 1,20-eicosane dioate.

17. A process for the preparation of the polyolefins with improved textile properties comprising mixing a finely ground dry crystalline polymer of an alpha-monoolefin of 2 to 5 carbon atoms having a specific viscosity of from about 0.10 to at least 0.25 with from 1 to 20 percent of a finely ground dry modified polyester formed by the reaction of at least one dicarboxylic acid and at least one glycol containing from 2 to 12 carbon atoms and modified by a compound selected from the group consisting of (A) aliphatic dicarboxylic acids containing from 16 to 32 carbon atoms and the alkyl diesters thereof, (B) heterocyclic glycols, (C) 0.05 mol percent to 1.0 mol percent, based on the total weight of said dicarboxylic acid, of a chain-terminator selected from the group consisting of polyalkylvinyl ethers having one terminal hydroxyl group wherein the alkyl group contains 1 to 4 carbon atoms, and compounds having the formula, (I)    R—O—[(CH$_2$)$_m$O]$_x$(CH$_2$)$_n$—OH wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (D) the polyesters of (C) containing 0.05 mol percent to 4.0 mol percent, based on the total weight of said dicarboxylic acid, of said chain-terminator, modified by 0.05 mol percent to 2.4 mol percent, based on the total weight of said dicarboxylic acid, of a chain-branching agent selected from the group consisting of compounds having the formula, (II)    R—(OH)$_n$ wherein R is a saturated aliphatic hydrocarbon radical containing from 3 to 6 carbon atoms and $n$ is an integer from 3 to 6, compounds having the formula, (III)    R—(CH$_2$OH)$_3$ wherein R is a saturated aliphatic hydrocarbon radical containing from 2 to 6 carbon atoms, compounds having the formula, (IV)
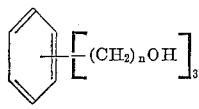

wherein $n$ is an integer from 1 to 6, and compounds having the formula, (V)
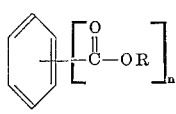

wherein $n$ is an integer from 3 to 5, and R is an alkyl radical of up to 3 carbon atoms, melting the mixture and stirring until a homogeneous polyolefin modified polyester blend is obtained.

18. The process of claim 17 wherein the polyester is polyethylene terephthalate, the chain-terminator is methoxypolyethylene glycol and the chain-branching agent is pentaerythritol.

19. A process for the preparation of polyolefin filaments and fibers having improved dyeability comprising mixing a crystalline polymer of an alpha-monoolefin of 2 to 5 carbon atoms with a modified polyester, said polyester formed by the reaction of at least one dicarboxylic acid and at least one glycol containing from 2 to 12 carbon atoms and modified by a compound selected from the group consisting of (A) aliphatic dicarboxylic acids containing from 16 to 32 carbon atoms and the alkyl diesters thereof, (B) heterocyclic glycols, (C) 0.05 mol percent to 1.0 mol percent, based on the total weight of said dicarboxylic acid, of a chain-terminator selected from the group consisting of polyalkylvinyl ethers having one terminal hydroxyl group wherein the alkyl group contains 1 to 4 carbon atoms, and compounds having the formula, (I)    R—O—[(CH$_2$)$_m$O]$_x$(CH$_2$)$_n$—OH wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (D) the polyesters of (C) containing 0.05 mol percent to 4.0 mol percent, based on the total weight of said dicarboxylic acid, of said chain-terminator, modified by 0.05 mol percent to 2.4 mol percent, based on the total weight of said dicarboxylic acid, of a chain-branching agent selected from the group consisting of compounds having the formula, (II)    R—(OH)$_n$ wherein R is a saturated aliphatic hydrocarbon radical containing from 3 to 6 carbon atoms and $n$ is an integer from 3 to 6, compounds having the formula, (III)    R—(CH$_2$OH)$_3$ wherein R is a saturated aliphatic hydrocarbon radical containing from 2 to 6 carbon atoms, compounds having the formula, (IV)
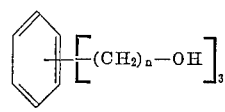

wherein $n$ is an integer from 1 to 6, and compounds having the formula, (V)
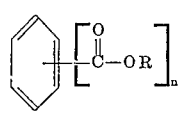

wherein $n$ is an integer from 3 to 5, and R is an alkyl radical of up to 3 carbon atoms, melting and stirring the mixture and extruding the resultant molten polymer through a suitable orifice to form filaments and fibers.

References Cited by the Examiner
UNITED STATES PATENTS

| | | | |
|---|---|---|---|
| 2,205,108 | 6/1940 | Rosen | 260—873 |
| 2,895,946 | 7/1959 | Huffman | 8—55 |
| 3,003,845 | 10/1961 | Ehlers | 260—873 |
| 3,023,184 | 2/1962 | De Witt | 260—30.2 |
| 3,092,435 | 6/1963 | Tessandoni | 8—55 |

FOREIGN PATENTS

| | | |
|---|---|---|
| 596,704 | 1/1948 | Great Britain. |

MURRAY TILLMAN, *Primary Examiner.*

LEON J. BERCOVITZ, DONALD E. CZAJA,
*Examiners.*